A. M. McDOUGALL.
VESSEL LOADING DEVICE.
APPLICATION FILED AUG. 25, 1919.
1,365,929.
Patented Jan. 18, 1921.
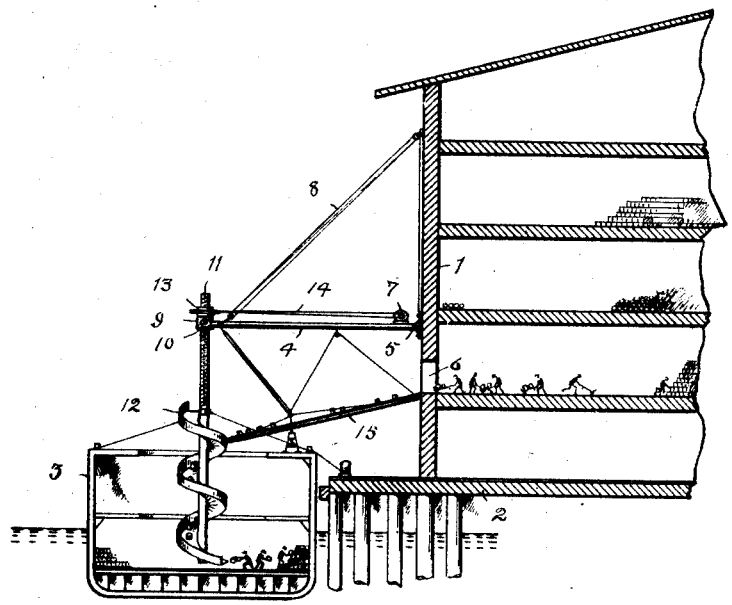
INVENTOR
BY Alexander Miller McDougall
ATTORNEY

UNITED STATES PATENT OFFICE.

ALEXANDER MILLER McDOUGALL, OF DULUTH, MINNESOTA.

VESSEL-LOADING DEVICE.

1,365,929.       Specification of Letters Patent.    Patented Jan. 18, 1921.

Application filed August 25, 1919. Serial No. 319,678.

*To all whom it may concern:*

Be it known that I, ALEXANDER M. McDOUGALL, a citizen of the United States, residing at Duluth, in the county of St. Louis and State of Minnesota, have invented certain new and useful Improvements in Vessel-Loading Devices, of which the following is a specification, reference being had therein to the accompanying drawing.

This invention relates to loading devices for vessels and has special reference to such devices for the loading of package freight into open decked vessels such as are common for carrying bulk freight, and provided ordinarily with superstructures at the fore and after ends only.

The principal object of the invention is to provide a device of this character by which package freight may be handled more expeditiously than heretofore.

Other objects and advantages of the peculiar construction will appear in the further description of the invention.

In the accompanying drawing forming part of this application and in which like reference characters represent like parts, is represented a vertical sectional view through one side of a warehouse on a dock, with a vessel moored thereat.

1 represents the wall of the warehouse adjacent the edge of the dock 2, at which it is customary to moor the vessel 3 for loading purposes. A boom 4 is pivotally mounted as at 5 in any desired manner to the wall 1 of the warehouse, preferably above the gangway 6 in the second story of the warehouse. This boom may be of any desired construction and I have illustrated it as carrying a motor 7 adjacent its pivotal end although this motor if preferred may be carried independently of the boom in some other manner that may prove more desirable.

The boom 4 is supported at its outer end by any suitable form of block and tackle illustrated at 8, and pivotally carries a sleeve or journal box 9 as at 10. In the box 9 is supported the screw-threaded stem 11 which carries upon its approximate lower half a spiral chute or conveyer 12 such as is common in the art and which is made of spiral form to prevent destructive descent of the packages traversing same.

The spiral chute 12 may or may not be rigidly fixed to the stem 11, and is capable of being manually rotated when it is desired to discharge the packages therefrom in different radial directions, the object of which is obvious.

Above the box 9, bearing thereupon and supporting the entire weight of the chute is an internally screw threaded sheave or sprocket 13 which is operated by a suitable belt 14 from the motor 7.

With this arrangement it is evident that the chute may be raised or lowered by the rotation of the sheave 13 and which may be conveniently governed by the motor 7.

At 15 I have illustrated an endless belt conveyer which may be of any desired construction for the conveying of the packages of freight from the gangway 6 to and within the spiral chute 12. This conveyer may be supported by suitable arrangement of tackle from the boom 14 or by means either upon the dock or the vessel and the conveyer may be power driven or operated only by gravity as the requirements may demand.

In loading vessels with package freight it is almost if not entirely the universal practice to load from the lowermost story in the warehouse which is upon a level with the top of the dock, such practice necessarily requiring elevation of the freight packages over the edge of a vessel of the type herein referred to and to obviate this is one object of my present invention and the practice of loading such a vessel with package freight from an elevation above the level of the upper deck thereof, is deemed novel.

It is evident that an ordinary freight elevator may be utilized for placing the package freight in the various upper stories of the building, as is in fact, common practice.

From the above it is apparent that the entire loading mechanism supported upon the boom 4 may be stowed away against the side of the building by the boom being raised and swung about or directly elevated as desired and that when lowered into a vessel may be quickly adjusted to any depth desired, for loading either in the extreme lower hold or on the between decks and that as the loading of the vessel progresses, by operation of the motor 7 the spiral chute may be raised and that by the turning of the chute manually to discharge or extreme lower end thereof may be pointed in any radial direction desired to facilitate the handling of the packages as they are discharged therefrom.

It is to be understood that various changes in detail of construction and modification within the scope of the appended claims may be resorted to without departing from the spirit of the invention.

Having thus described my invention what I claim and desire to secure by Letters Patent is:

1. A vessel loading device of the character described comprising in combination a horizontally disposed swinging boom support adjacent and spaced above the upper surface of a mooring place for vessels, a vertically adjustable shaft pivotally supported and journaled within the free end of the boom, a spiral chute carried by the shaft and means for conveying freight from the mooring place into the chute, substantially as described.

2. The combination with a dock having a freight storage building thereupon, of a rigid normally horizontally disposed boom pivotally mounted to the side of the building above the dock, a vertically disposed shaft pivotally journaled within the free end of the boom, means for raising and lowering the shaft independently of the boom, a spiral chute carried upon the lower portion of the shaft and means whereby freight may be transferred from the building into the spiral chute.

In testimony whereof I have hereunto affixed my signature in the presence of two witnesses.

ALEXANDER MILLER McDOUGALL.

Witnesses:
S. GEO. STEVENS,
S. C. BRONSON.